United States Patent Office 3,251,283
Patented May 17, 1966

3,251,283
PHOTOGRAPHIC SYSTEM
George A. Wood, Los Altos, Calif., assignor to Itek Corporation, Lexington, Mass., a corporation of Delaware
Filed Feb. 11, 1964, Ser. No. 344,089
10 Claims. (Cl. 95—12.5)

This invention relates to a photographic system and, more particularly, to a system for taking related stereographic pairs of both metric and panoramic photographs so as to enable the extraction of more accurate photogrammetric measurements than can be derived solely by the use of one or the other individually.

In the field of photographic aerial reconnaissance and mapping there is an increasing need to cover more and more areas in greater detail, and in order to graphically record the large areas involved and to resolve the desired ground detail, the cameras used must operate at extremely high resolution levels. The panoramic camera is best suited to provide both high resolution levels and wide angular coverage. Basically these are conflicting requirements, but such a camera with its transverse viewing sweep affords coverage of a wide area while maintaining relatively narrow field angles which are preferred for high reslution photography. Lenses providing wide angular coverage have various aberrations of considerable and undesirable significance.

Although the panoramic camera appears at present to be the only practicable camera capable of both adequate resolution and lateral coverage, the physical characteristics of such camera make its photographic output suspect geometrically even though the content of such output is of strikingly high resolution. In this connection, if panoramic photographs were taken when there is no change in the spatial relationship between the camera and the photographed object, the only difference in the geometry of conventional and panoramic photography would be caused by the fact that the latter is made on a cylindrical surface and the former on a plane. Even this simplicity of difference in camera image geometry presumes infinite accuracy of the panoramic camera's mechanical sweep motion.

Although the theoretical difference in camera geometry can be easily expressed in methematical forms, the use of panoramic photography for mapping and measuring purposes requires the camera to be mounted in a fastmoving vehicle and, consequently, the position and angular orientation of both the vehicle and camera with respect to the photographed object are continually changing. Therefore, any mathematical formulation that describes the process of panoramic photography from the geometric point of view must take into account the fact that many of the parameters in the process are varying with time. These time-variable parameters must be known to a satisfactory degree of accuracy. This requirement, however, is a fundamental difficulty which may be impossible to overcome if an aircraft is used as the camera-carrying vehicle, and if so, it makes infeasible a methematical formulation that is sufficiently rigorous and yet practicable.

Considering the precise recordation of all of the orientation variables which change with time to be practicably infeasible, it has been concluded that a procedure by which panoramic photography can be made reliable geometrically is to provide a framework within which the panoramic geometry can be constrained.

An object of the invention is that of providing a photographic system wherein the high resolution of panoramic photography is utilized in conjunction with relatively low resolution metric photography for the purpose of obtaining useful photographic information having the high resolution of panoramic photography and the geometric fidelity of metric photography—the net result, however, being synergistic in that point-by-point evaluation of the photographic information results in geometric accuracy superior to that which would be obtained by metric photography alone.

Another object of the invention is the provision of a photographic method and system in which both panoramic and metric photographs of a surface are taken concurrently from a remote station moving relative thereto to obtain topographic information concerning such surface having both a higher order of geometric fidelity and resolution.

Still another object is the provision of a photographic system in which high order distortional effects of terrain relief between concurrent panoramic and metric photographs are minimized.

Another object is to provide a photographic system in which convergent stereo pairs of panoramic photographs of a surface are taken from a remote station moving relative thereto, and concurrently therewith taking stereo pairs of near vertical metric photographs of such surface, all while maintaining the relationship $$\frac{B}{H} \leq \frac{L}{2f}$$

where B is the metric base line distance between any two successive photographing stations from which a stereo pair of panoramic frames are taken, H is the average shortest distance between the surface being photographed and the photographing stations, L is the length of each metric film frame along or in the direction of such base line B (usually such film frames are square because the cameras used have square film formats), and $f$ is the focal length of the metric camera utilizing such film.

A further object is that of providing a photographic system in which convergent stereo pairs of panoramic photographs are taken of a surface from a remote station moving relative thereto, each pair of such photographs overlapping adjacent pairs by at least 10%; and concurrently therewith taking stereo pairs of metric photographs, each pair of which overlaps adjacent pairs, while maintaining the aforesaid $B/H$ ratio within pre-established limits, and preferably no greater than 0.75 using a wide angle camera.

Additional objects and advantages of the invention will become apparent as the specification develops.

An embodiment of the invention is illustrated in the accompanying drawings, in which.

In a metric or frame camera, the lens acting as a perspective center forms an image of the scene to be recorded over the full area of a single frame of film. In using such a camera for aerial reconnaissance, exposures are made at regular intervals as the vehicle passes over the terrain; and the intervals are so timed that a sufficient overlap is recorded on the consecutive frames to completely record the area of interest. Although the resolution of such cameras is relatively low where wide-angle coverage is required, as in aerial reconnaissance, the geometric fidelity is high because each exposure is substantially instantaneous (1/250th of a second, for example); and, therefore, there is essentially no relative motion between the camera and terrain during each exposure interval, or between the camera and vehicle (image motion compensation, however, may be provided). Consequently, each or any terrain point represented in the photographic image can be accurately located with respect to a single perspective cone of imaging rays the geometry of which is known.

On the other hand, a panoramic camera is a scanning type of camera taking an exposure during an appreciable time (1 second, for example), and it sweeps the terrain of interest from side to side across the direction of the flight path of the vehicle. As in the case of the frame or metric camera, continuous coverage of the terrain is obtained by properly spaced exposures timed to give sufficient overlap between frames. Such a camera is able to provide high resolution levels because lens systems may be used that have relatively narrow field angles, in that wide angular coverage is obtained by the transverse sweep. The geometric fidelity of such cameras is unreliable, however, because the camera lens system is moving relative to the terrain, to the film, and to the vehicle throughout the time that each photographic image is being recorded; and as stated hereinbefore, it is not practicable to record each instantaneous position of the camera lens with sufficient accuracy to permit any and all points in a photographic image to be positively located.

Figure 1:
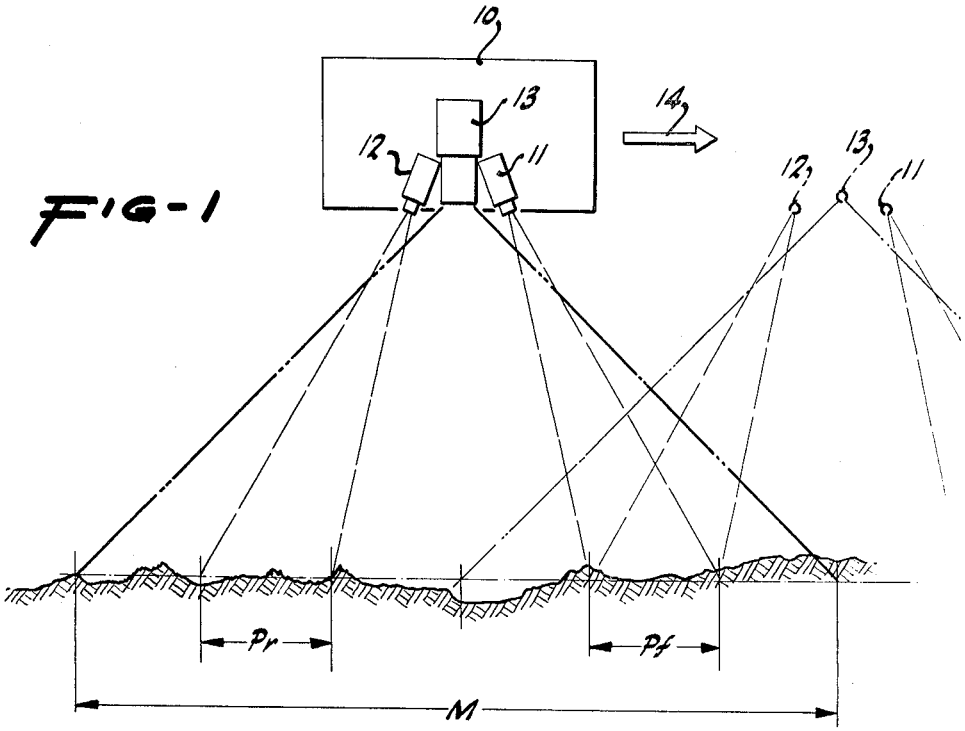
FIGURE 1 is a diagrammatic view depicting a space vehicle, such as an aircraft or orbiting spacecraft, equipped with both panoramic and metric cameras, and illustrating the longitudinal field of coverage defined by concurrently taken metric and panoramic film frames.

The photographic system disclosed herein obviates this difficulty by allowing the constraint of panoramic geometry within the geometric framework of the metric camera. In accordance with this procedure and as indicated in FIGURE 1, a plurality of cameras are mounted in a vehicle 10 which, by way of example, may be a conventional aircraft or an orbiting spacecraft. Such cameras comprise a pair of panoramic cameras 11 and 12 and a metric or frame camera 13. The vehicle is moving along a flight path generally indicated by the arrow 14, and the camera 11 is disposed so as to be forward-looking and the camera 12 so as to be rearward-looking relative to the motion of such vehicle along the flight path. The metric camera 13, however, is disposed so that the optical axis thereof is generally normal at any instant to the average plane of the terrain being photographed.

All of the cameras may be conventional instruments appropriately mounted in the vehicle 10 by any standard and well known means. Accordingly, the cameras 11 and 12, the lens systems thereof or certain other components depending upon the type and make of the cameras, reciprocate transversely of the flight path 14 and thereby sweep the terrain from side to side across the direction of movement of the vehicle. (It may be noted that orbiting-type panoramic cameras are known which can be used, and in such event the motion of the camera is orbital rather than reciprocable; but in either event the same general type of scanning operation is performed.) The metric camera 13 is fixed relative to the vehicle 10; and since it is desired that the exit pupil of the metric camera 13 be close to the exit pupils of the cameras 11 and 12 to minimize or avoid the effects of differential relief displacements in corresponding images, the metric camera may be disposed intermediate the panoramic cameras (as shown) and may be carried by the same mount used therefor. By way of example, a panoramic camera that can be used in the vehicle 10 is one made and sold by Itek Corporation under the trade name "Hyac"; and an example of a suitable metric camera is one sold by Wild Heebrugg Ltd. under the trade name RC5A.

The general field of longitudinal coverage accommodated by the cameras in each frame is also generally indicated in FIGURE 1, and it is seen that the field covered by the metric camera 13 is substantially greater than the corresponding fields covered by each of the panoramic cameras 11 and 12, and is actually greater than the combined fields of coverage thereof. For positive identification, the longitudinal field covered by each metric frame is denoted by the dimension M and, correspondingly, the longitudinal fields of coverage respectively provided by the panoramic cameras 11 and 12 are denoted by the dimension $Pf$ and $Pr$. As shown best in FIGURE 2, the lateral or transverse fields of coverage provided by the metric and panoramic cameras are substantially coextensive, but in certain instances the transverse coverage defined by the sweep of the panoramic cameras might exceed that defined by the metric camera, or vice versa, which is of no moment in that only the coextensive transverse fields of coverage need be considered.

Figure 2:
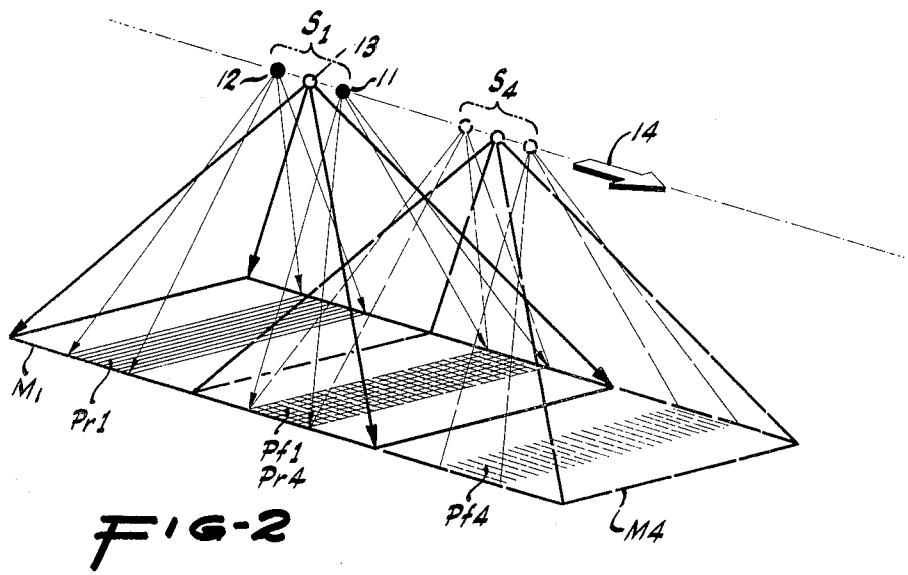
FIGURE 2 is a diagrammatic perspective view indicating the fields of coverage of the cameras, and illustrating the relationships of certain non-consecutive fields, the film frames corresponding thereto being taken at spaced positions along the vehicle flight paths, intermediate taking-positions being eliminated for clarity of detail.
Figure 3:
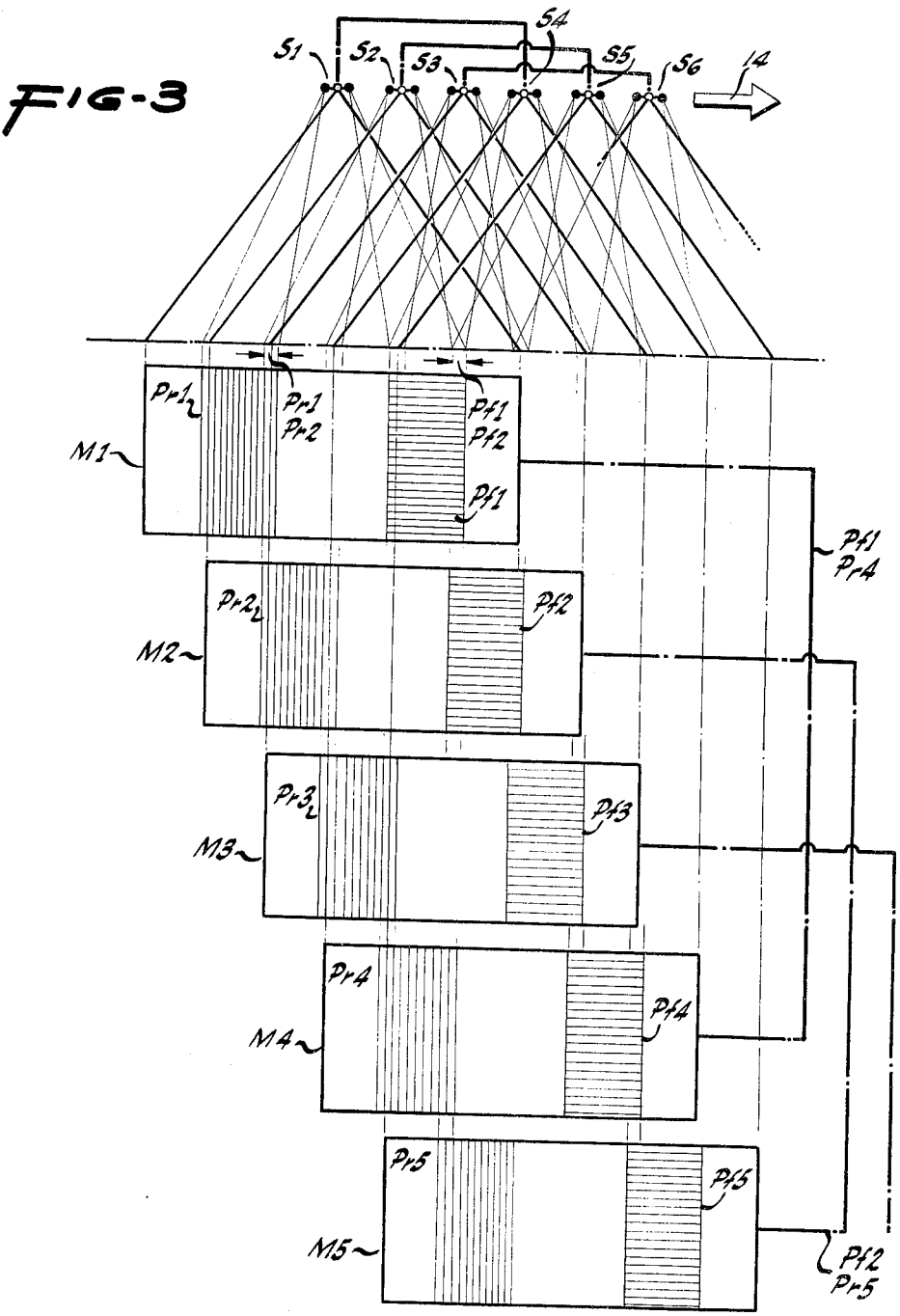
FIGURE 3 is a diagrammatic view indicating the field overlap of a succession of panoramic and metric photographs successively taken as the space vehicle travels along its flight path, and further illustrating the frame overlap appropriately correlated with the successive taking-stations.

As illustrated in FIGURE 3, the metric and panoramic cameras are actuated concurrently at predetermined time intervals as the vehicle travels along the flight path 14 so that a succession of overlapping photographic frames are taken—one by each of the three cameras at station S1, the next frame at station S2, the following at station S3, and so forth until the cameras are deactuated. In FIGURE 2 the fields of coverage of the photographic frames taken at stations S1 and S4 are illustrated, but the fields of coverage of the intermediate frames taken at stations S2 and S3 have been omitted for purposes of clarity of detail. In accordance with the particular illustration, the overlap of the metric frames M1 and M4 (which are respectively taken at stations S1 and S4) is about 50%, and the overlap of the panoramic frame $Pf1$ taken by the forward-looking camera 11 at station S1 and the frame $Pr4$ taken by the rearward-looking camera 12 at the station S4 is approximately 100% which is graphically illustrated by the checkerboard hatching.

The fields covered by the panoramic camera 12 at the station S1 and by the panoramic camera 11 at the station S4 are also indicated in FIGURE 2 by the respectively lined areas and are denoted with the symbols $Pr1$ and $Pf4$. Thus, in the particular system depicted in FIGURE 2, a stereo pair of panoramic photographs is defined by the overlapping panoramic fields, the frames of which are taken at stations S1 and S4. Accordingly, the next stereo pair to be defined by the frames will be taken at the stations S2 and S5, the following at stations S3 and S6, and so forth, as indicated in FIGURE 3 by the line linkage connecting such station pairs for purposes of graphic illustration. Quite evidently, a number of combinations of the metric frames (M1, M2, M3 and M4 in FIGURE 3) provide stereo coverage corresponding to the panoramic stereo pair $Pr4$ and $Pf1$, and, consequently, there is unavoidable redundancy of metric coverage.

In FIGURE 2 the ground swaths or fields of coverage provided by the panoramic cameras are shown with the forward and rearward edges thereof disposed in parallel alignment. This definition of the fields has been selected to simplify the illustrations; but as is well known, the actual field described by each sweep of the panoramic camera is much wider at the transverse edges or horizons than at the center because of the angular sweep motion of the camera. Additionally, such forward and rearward edges may be slightly arcuate because of the motion of the vehicle relative to the terrain during each sweep of the panoramic cameras.

In the particular timing sequence or station spacing shown in FIGURES 2 and 3, the field of overlap provided by adjacent or successive panoramic frames (that is, the frames successively taken by the forward-looking camera 11 at stations S1 and S2, and also the frames successively taken by the rearward-looking camera 12 at stations S1 and S2) is in the order of 10%; and for purposes of identification, the respective areas of overlap accorded by the panoramic cameras 11 and 12 at the stations S1 and S2 are denoted $Pf1$–$Pf2$ and $Pr1$–$Pr2$ in FIGURE 3.

The particular overlaps indicated heretofore are advantageous in that they obviate the likelihood of omissions or gaps in the photographic coverage of the terrain of interest which might occur if the overlaps were smaller and, for example, navigational errors resulted in the camera-carrying aircraft traversing a flight path other than the one calculated therefor. Further, any redundancy in the photographic coverage resulting from such overlaps can be advantageously utilized in bridging operations that comprise a part of the photogrammetric consideration of the photographs. Thus, an overlap in the order of 10% of successive panoramic frames and an overlap in the order of about 50% in the metric frames taken at the two stations respectively corresponding to those providing a stereo pair of panoramic photographs is considered ideal. Further, as heretofore indicated, a stereo pair of panoramic photographs respectively provided by the forward and rearward-looking cameras has essentially 100% overlap or stereo coverage.

The forward and rearward-looking panoramic photographs and the metric photograph are taken concurrently at each photographing station; and in practical terms, the two panoramic cameras are synchronized so that they sweep transversely of the flight path substantially simultaneously. Thus, both such cameras initiate and terminate their exposures at about the same time. The metric camera is desirably synchronized with such transverse sweeping motions of the panoramic cameras so that a metric exposure is taken about the mid-point of the transverse exposure sweep of the panoramic cameras. While such timing is considered ideal, the photographic information obtained could be usefully employed if such simultaneity in the panoramic and in the panoramic-as-related-to-the-metric were not observed. However, some distortional effects would be introduced which would have to be accommodated or compensation made therefor in subsequent use of the photographs if extreme accuracy in their interpretation is to be obtained. Therefore, the term concurrent while including the desirable timing sequence indicated, is intended to include departures therefrom so long as the panoramic and metric photographs are taken at about the same times at about the same stations.

In a similar manner, the panoramic and metric photographs are taken from essentially the same perspective center for this orientation of the cameras tends to eliminate or minimize high order distortional effects or differential relief displacements which occur when the photographs are not so taken. However, practically, the lenses of the three cameras are not located at precisely the same perspective center, for then the exit pupils of the three cameras would have to occupy the same precise position. Again, the photographic output of the cameras would be useful if the exit pupils of the cameras were located at divergent positions within the aircraft, but compensation would have to be provided for the higher order (third, fourth, fifth order, etc.) distortional effects in utilizing the photographic output of the cameras if extreme accuracy is required in the interpretation thereof.

The metric camera is also oriented so that the optical axis thereof is substantially normal to the average plane of the terrain because the more nearly such axis approaches 90°, the greater the probability is of obtaining accuracy in the coverage of the terrain. Stated another way, as the $B/H$ ratio increases, the greater the likelihood that hills, tall buildings, etc., will hide areas on the side thereof opposite that of the camera lens. Considering the $B/H$ ratio in greater detail, and referring to FIGURES 4 and 5 in particular, the following may be taken as exemplary of a practical determination.

Consider as requirements that the following conditions exist in the photographic coverage:

(a) The flight strip should be completely covered by the wide angle ($f=1\frac{1}{2}''$) metric photography so that aerial triangulation may be accomplished.

(b) Panoramic photography should consist of convergent stereo pairs overlapping adjacent pairs by at least 10%;

(c) If very high altitude photography is to be used, the greatest possible $B/H$ ratio should be provided that does not produce an unrealistic redundancy in the metric coverage.

Consider also that the cameras used have the following characteristics:

| Characteristic | Panoramic | Metric |
| --- | --- | --- |
| Focal Length | 24 inches | 1½ inches. |
| Film Size | 70 millimeters | 70 millimeters. |
| Format Size | 58 x 745 mm | 58 x 58 mm. |
| Resolution | 120 L/mm | 80 L/mm. |
| Minimum Cycle Time | 2.5 seconds | |

The basic limitation on the $B/H$ ratio is imposed by the overlap of the wide angle metric photography. Employing a wide angle metric camera of $f=38$ millimeters and a format of 58 millimeters (the length of the film frame along the base line B), the maximum $B/H$ ratio is 0.76. Assuming deviations in the parallelism of camera axes due to platform rotations, the practical limit on the $B/H$ ratio is somewhat less than the maximum. If a satellite platform is utilized, the significant factors affecting the $B/H$ ratio are in the order of the following:

$H = 186$ miles
$V = 4.7$ miles per second
$d\phi = \mp 0.6$ min. of arc/sec.

Making the equation $$B' = H \tan\left(\frac{\gamma}{2} - \Delta C\right)$$

where $$\Delta C = \frac{H \tan \frac{\gamma}{2}}{V} d\phi = 18'$$

it is found that $B' = 140$ miles and $B':H = 0.75$ which is the limiting value of the ratio used in further investigations.

Assume that convergent panoramic photographs will be taken at the same camera stations as the metric photography and vice-versa, due to requirements for panoramic-metric correlation. Thus, since the panoramic longitudinal field of view is so limited ($\gamma = 5°26'$), it is obvious that there will be redundant metric coverage. This redundant metric coverage is, within limits, a major advantage. The focal length of the metric camera is quite short and thus the scale small. In the bridging operations then, redundant strips of photography will lend strength to the bridge when triangulated separately and adjusted simultaneously.

Figure 4:
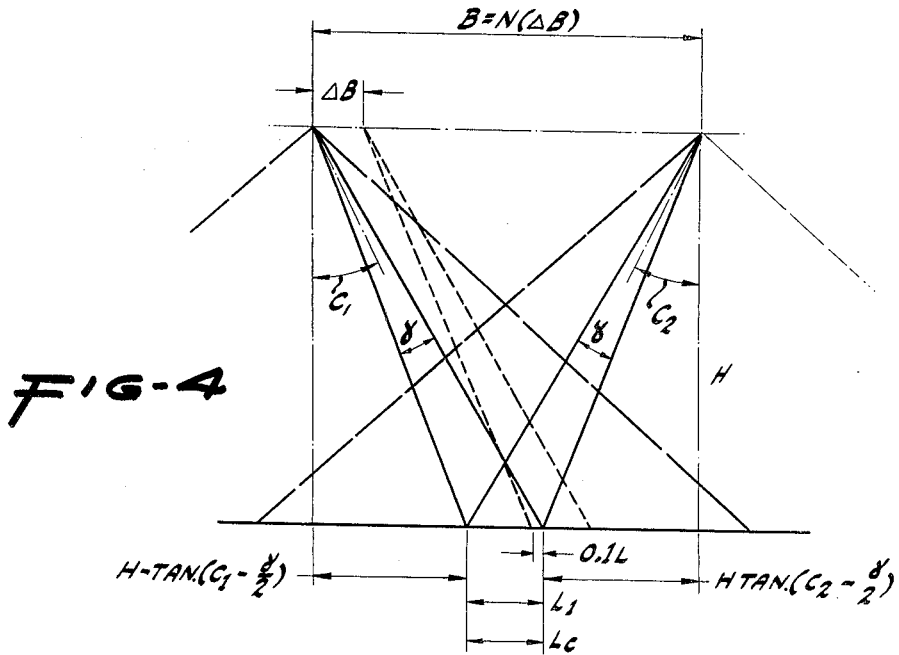
FIGURE 4 is a diagrammatic view illustrating the geometry of a one-metric-model length of the flight line of the space vehicle.

The resulting geometry of a one-metric-model length of the flight line is shown in FIGURE 4. Thus, from this figure the following equations are derived:
The length ($L_1$) of the panoramic overlap is $$L_1 = H\left[\tan\left(C_1 + \frac{\gamma}{2}\right) - \tan\left(C_1 - \frac{\gamma}{2}\right)\right]$$

A second condition for this length is $$L_c = B - H\left[\tan\left(C_1 - \frac{\gamma}{2}\right) - \tan\left(C_2 - \frac{\gamma}{2}\right)\right]$$

Equating $L_1$ and $L_c$ and asserting that $C_1 = C_2$, we find that $$B:H = \tan\left(C - \frac{\gamma}{2}\right) + \tan\left(C + \frac{\gamma}{2}\right)$$

Also, fulfilling the condition that panoramic models must overlap by 10% results in the equation for $\Delta B$ which is the distance between panoramic camera stations. Thus, $$\Delta B = .9H\left[\tan\left(C - \frac{\gamma}{2}\right) - \tan\left(C - \frac{\gamma}{2}\right)\right]$$

A further condition must be fulfilled in the photographic scheme. This condition is that the basic metric base line distance must be divided such that $$\frac{B}{\Delta B} = N$$

where N is an odd integer. That $B/\Delta B$ must be an integer is obvious but only the requirement that $C_1 = C_2$ requires that N be an odd integer. Thus, $$\frac{B}{\Delta B} = \frac{1.1\left[\tan\left(C - \frac{\gamma}{2}\right) + \tan\left(C + \frac{\gamma}{2}\right)\right]}{\tan\left(C + \frac{\gamma}{2}\right) - \tan\left(C - \frac{\gamma}{2}\right)} = N$$

It will be assumed that $N = 5$. This substitution results in the equation $$1.57 \tan\left(C - \frac{\gamma}{2}\right) - \tan\left(C + \frac{\gamma}{2}\right) = 0$$

by which we may solve for C. It is found that $$C = 12°39'$$

Substituting C, H and $d\phi$ into the original equations above, the following values are derived:

$B:H = 0.45$
$L_1 = 18.5$ miles
$\Delta B = 16.7$ miles
$t_{\Delta B} = 3.6$ seconds
$\Delta C_{AB} = \pm 2.0$ min. of arc
$B = 83.5$ miles
$t_B = 17.8$ seconds
$\Delta C_B = \pm 10.7$ min. of arc From the above values we see that the resulting $B:H$ ratio is usable although somewhat small. N could equal 7 but the redundancy of coverage would become very cumbersome.

Though five separate strips of metric photography are available for bridging in the above case, this number is more than adequate. Three would probably be ideal to attain bridging strength through adjustment and identify and eliminate blunders. However, although only one or more strips need be involved in the bridging operation, it is still necessary to measure sufficient points in all metric photographs to allow the performance of a resection computation. These points, of course, must be included in the bridging computations even though the photographs themselves are not used.

As a check, it is necessary to determine whether the 10% overlap of adjacent panoramic models is sufficient to preclude coverage gaps. These gaps probably would result from a change in pitch angle of the camera-bearing vehicle.

Figure 5:
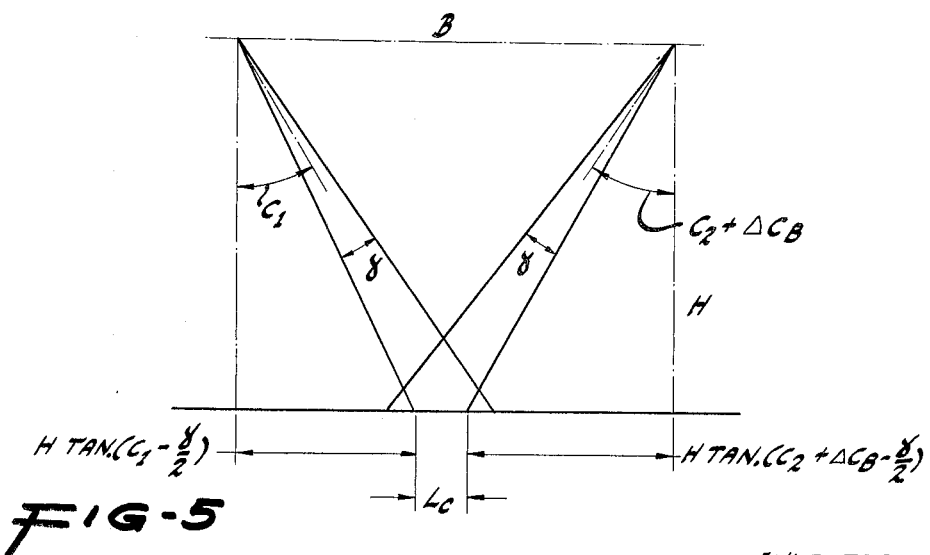
FIGURE 5 is a diagrammatic view illustrating the error geometry associated with the geometry illustrated in FIGURE 4.

To evaluate the overlap condition, the $L_c$ equation given above and FIGURE 5 may be utilized. Primary interest is in the condition where one camera axis deviates from parallelism with the other. If the $L_c$ equation is rewritten.

$$L_c = B - H\left[\tan\left(C_1 - \frac{\gamma}{2}\right) + \tan\left(C_2 - \frac{\gamma}{2} + \Delta C_B\right)\right]$$

where $$C_1 - \frac{\gamma}{2} = 9°56'$$

and $$C_2 - \frac{\gamma}{2} + \Delta C_B = 10°07'$$

then $$L_c = 17.8 \text{ miles}$$

and $$\frac{L_1 - L_c}{L_1} 100 = 3.8\%$$

The resulting percentage is considerably less than the overlap percent considered in the derivation of equations. The above evaluation indicates that the given cameras may be joined in a satellite photographic mission to give a complete combination coverage.

It is believed that the terms and relationships represented by the symbols employed in the foregoing analysis are evident from the description and drawings and because the relationships are essentially trigonometric functions, but for convenience the following summary is provided:

B is the metric base line distance between any two successive photographing stations from which a stereo pair of panoramic frames are taken (B' being the same as B but being a trial factor);

H is the average shortest distance between the surface being photographed and the photographing stations (the measurement would actually be taken from the exit pupil of the metric camera);

V is the translational velocity of the space vehicle;

L is the length of any metric film frame along or in the direction of the base line B;

f is the focal length of the metric camera;

C is the angle between the essentially vertical optical axis of the metric camera and the optical axis of the panoramic camera, $C_1$ being such angle related to the forwardly-looking panoramic camera, $C_2$ being such angle related to the rearwardly-looking panoramic camera, $\Delta C_B$ being an angular error due to the angular tipping rate of the vehicle;

$\gamma$ being the field angle of either or both of the panoramic cameras;

$L_1$ and $L_c$ being the length of the panoramic stereo overlaps, and 0.1L being the length of overlaps of successive panoramic frames;

N is an odd integer mathematically defined in the foregoing analysis;

$t_B$ is the time in seconds required for the space vehicle to traverse the distance between the two photographing stations illustrated in FIGURES 4 and 5, such stations corresponding to stations $S_1$ and $S_4$ as shown in FIGURES 2 and 3;

$d\phi$ is an angular tipping rate experienced by the space vehicle causing a departure from parallelism of the metric camera optical axes as between the two taking stations;

$\Delta$ is the conventional mathematical symbol indicating a small change in a factor used in conjunction with the symbol.

Evidently, the photographic system described is capable of producing vertical metric stereo coverage and convergent panoramic stereo coverage of a strip of terrain. The convergent panoramic coverage provides a stereo overlap in the order of 100%, and the generally or near vertical metric photographs produce stereo pairs having a minimum overlap in the order of 50% (the permissible overlap can always be greater than 50%). In the particular system described, three cameras are employed—one forwardly-looking panoramic camera, one rearwardly-looking panoramic camera, and an essentially vertically oriented metric camera. The exit pupils of such cameras are disposed so that the panoramic cameras have approximately the same perspective center as the metric camera so as to obtain nearly congruent bundles of light rays entering the cameras which minimizes the distortional effects of terrain relief. The film frames taken by the three cameras at each photographing station are exposed substantially concurrently.

The result of such arrangement provides metric and panoramic photographs which are superimposable over significant areas by planar transformations of image geometry in orders no higher than second (that is, translation, rotation, scale, and shape). The metric and panoramic photographs may then be utilized in photogrammetric measurements, with the result that the high resolution levels provided by the panoramic photography is utilized in conjunction with the geometric fidelity provided by the metric photography to obtain photographic information having the advantages of both types of photography. However, something more than the summation of these two advantages is realized in that point-by-point evaluation of the photographic information affords a synergistic result in that the geometric accuracy of each such point is superior to that which would be obtained by metric photography alone because each point is more accurately analyzable in that the resolution or detail concerning the same is significantly greater as a result of the contribution made thereto by the panoramic photography.

While in the foregoing specification an embodiment of the invention has been set forth in considerable detail for purposes of making an adequate disclosure thereof, it will be apparent to those skilled in the art that numerous changes may be made in such details without departing from the spirit and principles of the invention.

What is claimed is:

1. In a method of photographing a surface from a remote station moving relative thereto to obtain topographic information having both a high order of geometric fidelity and resolution, the steps of taking panoramic photographs of such surface from said station at spaced locations to obtain convergent stereo pairs of panoramic photographs, also taking metric photographs at such spaced locations to obtain stereo pairs of metric photographs, and during the taking of said photographs maintaining the relationship $$\frac{B}{H} \leq \frac{L}{2f}$$

where B is the metric base line distance between such photographing location, H is the average shortest distance between said surface and said station at such locations, L is the length of the metric film frame along such base line B, and $f$ is the focal length of the photographic equipment used to take such metric photographs.

2. The method of claim 1 in which the panoramic and metric photographs are taken from essentially the same perspective center so as to minimize the effects of differential relief displacements in corresponding metric and panoramic photographic images.

3. The method of claim 1 in which the panoramic and metric photographs are taken substantially concurrently at such spaced locations.

4. In a method of photographing a surface from a remote station moving relative thereto to obtain topographic information having both a high order of geometric fidelity and resolution, the steps of taking panoramic photographs of such surface from said station at spaced locations to obtain convergent stereo pairs of panoramic photographs, substantially concurrently therewith taking metric photographs of said surface at such spaced locations to obtain stereo pairs of metric photographs, during the taking of said photographs maintaining the relationship $$\frac{B}{H} \leq \frac{L}{2f}$$

where B is a the metric base line distance between such photographing locations, H is the average shortest distance between said surface and said station at such locations, L is the length of the metric film frame along such base line B and $f$ is the focal length of the photographic equipment used to take such metric photographs, and taking both the metric and panoramic photographs from essentially the same perspective center so as to minimize the effects of differential relief displacements in corresponding metric and panoramic photographic images.

5. The method of claim 4 in which the aforesaid $B/H$ ratio is in the order of 0.75.

6. The method of claim 4 in which the convergent stereo pairs of panoramic photographs have an overlap of approximately 100%.

7. In a method of photographing a surface from a remote station moving relative thereto to obtain topographic information having both a high order of geometric fidelity and resolution, the steps of providing at such remote station panoramic camera equipment operative to take a forward-looking photograph and also a rearward-looking photograph, also providing at such remote station metric camera equipment operative to take a downwardly oriented photograph, constraining said camera equipment so that the exit pupils thereof have essentially the same perspective center so as to minimize the effects of differential relief displacements in corresponding panoramic and metric photographic images, taking panoramic photographs of said surface at successive predetermined intervals from said station as it is moving relative to said surface so as to obtain convergent stereo pairs of such photographs each pair of which respectively comprises a forward-looking photograph taken at one such interval and a rearward-looking photograph taken at another such interval, substantially concurrently therewith taking a metric photograph of said surface from said station at each such interval, and timing such intervals so that a stereo array of both the panoramic and metric photographs is obtained with substantially no gaps in the photographic coverage of at least certain areas of said surface.

8. The method of claim 7 in which such intervals are timed so that the convergent stereo pairs of panoramic photographs have an overlap of approximately 100%.

9. The method of claim 7 including the step during the taking of said photographs of maintaining the relationship $$\frac{B}{H} \leq \frac{L}{2f}$$

where B is the metric base line distance between such photographing locations, H is the average shortest distance between said surface and said station at such locations, L is the length of the metric film frame along such base line B and $f$ is the focal length of the photographic equipment used to take such metric photographs.

10. The method of claim 9 in which said panoramic camera equipment includes two panoramic cameras one of which is forward-looking and the other of which is rearward-looking.

References Cited by the Examiner

UNITED STATES PATENTS 2,433,534  12/1947  Sonne _____ 95—12.5 X
2,665,481   1/1954  Henry _____ 33—1

JOHN M. HORAN, *Primary Examiner.*